United States Patent [19]
Carl

[11] Patent Number: 4,762,294
[45] Date of Patent: Aug. 9, 1988

[54] ELEVATOR CONTROL SYSTEM ESPECIALLY FOR AN AIRCRAFT

[75] Inventor: Udo Carl, Bremen, Fed. Rep. of Germany

[73] Assignee: Messerschmitt-Boelkow-Blohm Gesellschaft mit beschraenkter Haftung, Bremen, Fed. Rep. of Germany

[21] Appl. No.: 94,824

[22] Filed: Sep. 9, 1987

[30] Foreign Application Priority Data

Sep. 12, 1986 [DE] Fed. Rep. of Germany ....... 3631090
Nov. 13, 1986 [DE] Fed. Rep. of Germany ....... 3638821

[51] Int. Cl.⁴ .............................................. B64C 13/42
[52] U.S. Cl. .................. 244/75 R; 244/227; 244/194
[58] Field of Search ............... 244/75 R, 76 R, 220, 244/221, 226, 227, 228, 236, 87, 194

[56] References Cited

U.S. PATENT DOCUMENTS

| 2,823,879 | 2/1958 | Smith et al. | 244/227 |
| 3,773,282 | 11/1973 | Sands et al. | 244/227 |
| 4,533,097 | 8/1985 | Aldrich | 244/76 R |

FOREIGN PATENT DOCUMENTS

| 777273 | 6/1957 | United Kingdom . |
| 780759 | 8/1957 | United Kingdom . |
| 801080 | 9/1958 | United Kingdom . |
| 803577 | 10/1958 | United Kingdom . |
| 803576 | 10/1958 | United Kingdom . |
| 803572 | 10/1958 | United Kingdom . |
| 919266 | 2/1963 | United Kingdom . |

*Primary Examiner*—Galen Barefoot
*Assistant Examiner*—Rodney Corl
*Attorney, Agent, or Firm*—W. G. Fasse; D. H. Kane, Jr.

[57] ABSTRACT

An elevator control system especially for an aircraft such as an airplane, is equipped with an electrically controllable elevator flap drive system for the elevator flap on each side of the aircraft. Additionally, the system is equipped with a mechanically controlled auxiliary drive system which is responsive to a hand wheel operated by the pilot. A single hand wheel has mechanical connecting links to the elevator flaps on both sides of the aircraft. Monitoring features enable the pilot to test the auxiliary mechanical drive system without actually switching on that system. The auxiliary mechanically operated system is functional even if all other power systems failed, since a ram air turbine is provided for generating the hydraulic pressure for driving the auxiliary system.

14 Claims, 3 Drawing Sheets

ELEVATOR CONTROL SYSTEM ESPECIALLY FOR AN AIRCRAFT

CROSS REFERENCE TO RELATED APPLICATIONS

This application relates to U.S. Ser. No. 094,830, which was filed on Sept. 9, 1987; and also relates to U.S. Ser. No. 094,831, which was filed on Sept. 9, 1987. Both are allowed.

FIELD OF THE INVENTION

The invention relates to an elevator control system especially for an aircraft with a primary electrical control path and with an emergency mechanical control path, especially for an airplane.

DESCRIPTION OF THE PRIOR ART

It is known to control the elevator assembly of an aircraft with the aid of the so-called fly-by-wire technique involving a strictly electrical operation. The passenger airplane "AIRBUS A 320" is an example in which such strictly electrical control is employed. In this type of control the pilot produces the control signals with the aid of so-called side sticks 1 in a mechanical way and the respective mechanical signals are converted into electrical signals with the aid of a sensor arrangement to provide signals useful for the control of an elevator assembly of the aircraft. The mechanically produced signals converted into electrical signals or the signals produced by an autopilot 2 provide control signals which are supplied to redundant computer groups 3 which process these signals and hold the signals ready for application to the individual electro-hydraulic elevator control systems. In these conventional elevator assemblies each assembly of an aircraft comprises only two electrically controlled hydraulic drive systems.

OBJECTS OF THE INVENTION

In view of the foregoing it is the aim of the invention to achieve the following objects singly or in combination:

to provide, for the elevator control system of an aircraft, a mechanical control link which will take over when the electrical control link should fail, whereby the mechanical control link is responsive to mechanically provided signals;

to provide an improved safety level for the elevator control system of an aircraft, as compared to conventional systems; and to improve a fly-by-wire system in such a way that it is simplified while simultaneously achieving a weight reduction as well as a functional, advantageous integration of the mechanical control link into the fly-by-wire system.

SUMMARY OF THE INVENTION

The elevator control system according to the invention improves the safety of an elevator control system by providing for each elevator assembly on each side a mechanically controlled drive or servo-system. Both mechanically controlled servo-systems are controllable by a mechanical elevator control member after a total failure of the electrical on-board power system or after a double failure of the hydraulic system.

More specifically, the hydro-mechanical elevator drive system is maintained in a bypass during normal electrically signalled control of the aircraft. The hydromechanical elevator drive system comprises for each elevator assembly on each side of the aircraft, an automatically operating shut-off logic unit which is controlled by the aircraft steering or control computer and which activates one each of said hydraulic elevator drive systems which are responsive to mechanical signals when the electrically operated drive systems of both elevator assemblies fail, or if the electrical power supply totally fails. Thus, one mechanically responsive elevator drive system is activated for each elevator assembly. The electrically operated hydraulic systems for the two elevator assemblies which are operable by the pilot through a switch and a switching unit, can be switched off manually or are switched off automatically in the said case of total electrical failure and the mechanically operable elevator drive system of both elevator assemblies is activated. The control of both elevator flaps is then performed with the above mentioned hand wheel which is connected through a cable to a mechanical signal distributor for simultaneously transmitting the mechanical control signals to a right and left signal linkage; The signal linkages transmit the mechanical signals through spring boxes and via the mechanical coupling and synchronizing units to the mechanically signalled drive systems (servo actuators). During normal flight operation the elevator displacements produced by the electro-hydraulic elevator drive systems in response to electrical flight control signals, are transmitted by an electro-motor drive to the hand wheel. In case that all central, from engine mounted hydraulic pumps generated hydr. systems fail, the hydraulic pressure required for the operation of the mechanically controlled hydraulic system, is produced by a ram air turbine provided for this purpose in the aircraft.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
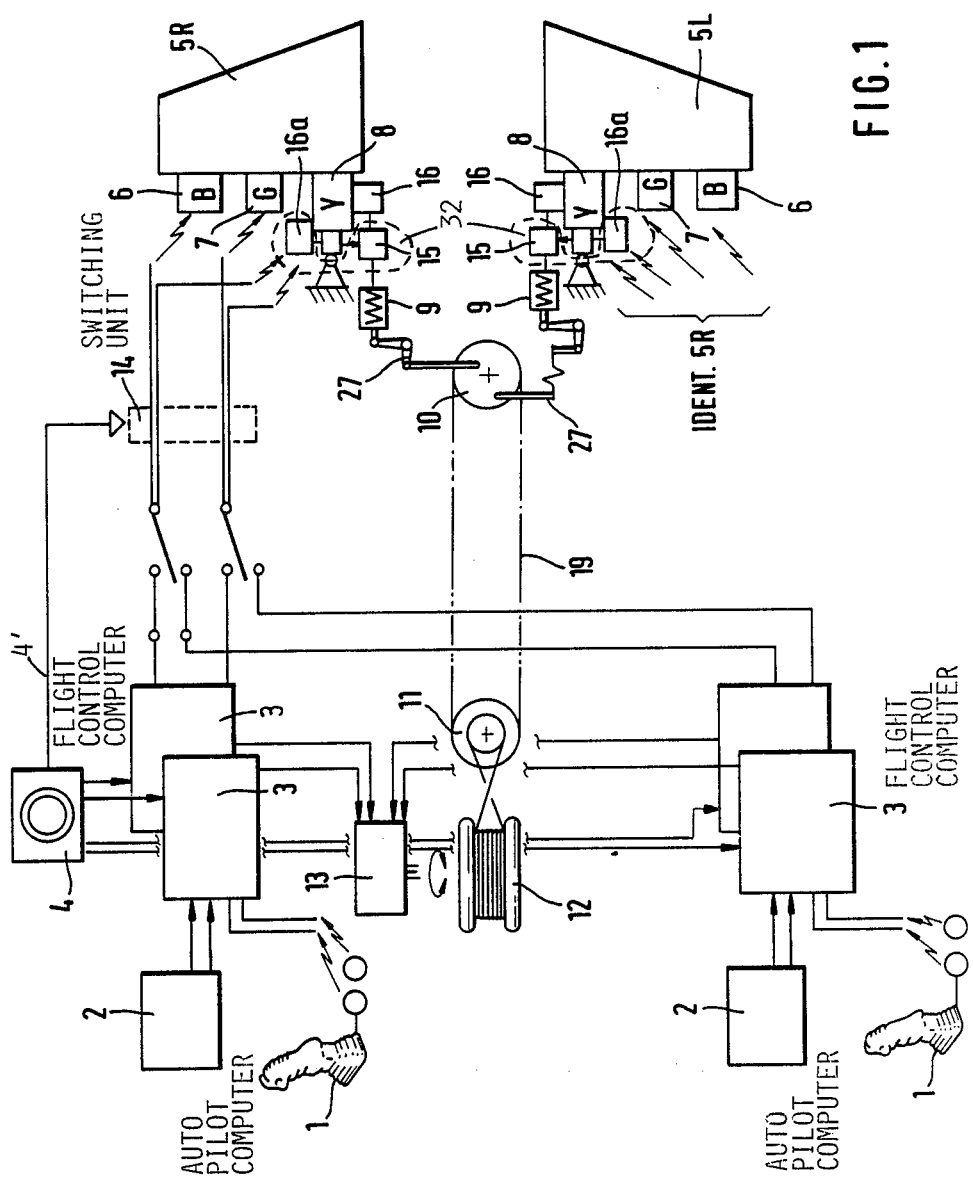
FIG. 1 illustrates a block diagram of a fly-by-wire elevator control system in which the auxiliary mechanical control and drive system according to the invention is integrated.

Referring to FIG. 1, in the normal control operation of the right and left elevator flaps 5R and 5L only the electrically operable and controlled hydraulic drive systems 6 and 7 are alternately activated while the auxiliary mechanically controlled and operated drive system 8 is in a passive or bypass state. The auxiliary mechanical drive system 8 is activated in response to a second fault in the electric control systems, or in response to a total failure of the electrical power supply, or in response to a double failure in the hydraulic systems B and G included in the drive systems 6 and 7. This switch-over or activation of the auxiliary drive system 8 can take place automatically or the pilot may cause the switch-over. In both instances the elevator flaps 5R and 5L are then mechanically driven by the system 8 after the switch-over.

For causing the switch-over from the normal operation to the auxiliary mechanical elevator drive system 8, the switch-off signals for the electrically controlled hydraulic drive systems 6 and 7 and the switch-off signals 30, 31 to the mechanically controlled auxiliary system 8 must pass through a switching unit 14 that is operable by the pilot through a test switch 4 electrically connected to the switching unit 14. Normally, the switch 4 is closed. If faults occur or if the pilot wants to test the system, he opens the switch 4 to thereby interrupt the circuits from the computer 3 to the drive systems 6 and 7. This interruption may involve individual and/or all conductor connections.

Figure 3:
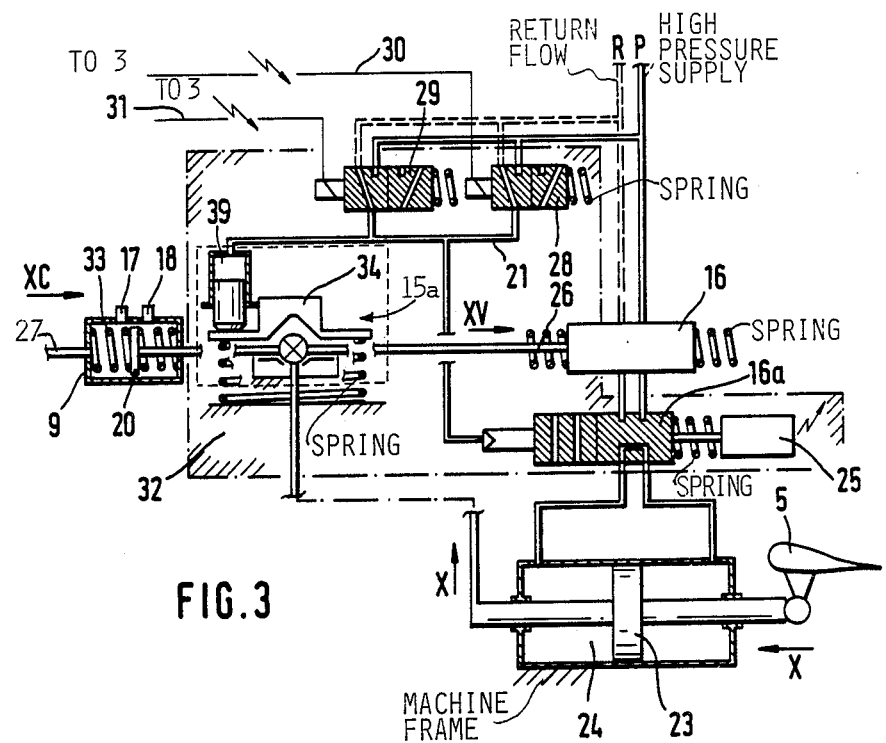
FIG. 3 shows a hydraulic, mechanical logic circuit diagram for switching the auxiliary mechanical control into a bypass position in which it is not effective, or into an effective state.

When the conductors on which signals 30 and 31 pass to the switch-off logic units 32, please see FIG. 3, are interrupted, the mechanically controlled hydromechanic auxiliary drive system 8 is switched-on automatically. This operation is intended as a test procedure prior to take-off of an aircraft for testing the function of the auxiliary or emergency operational steering mode.

Figure 2:
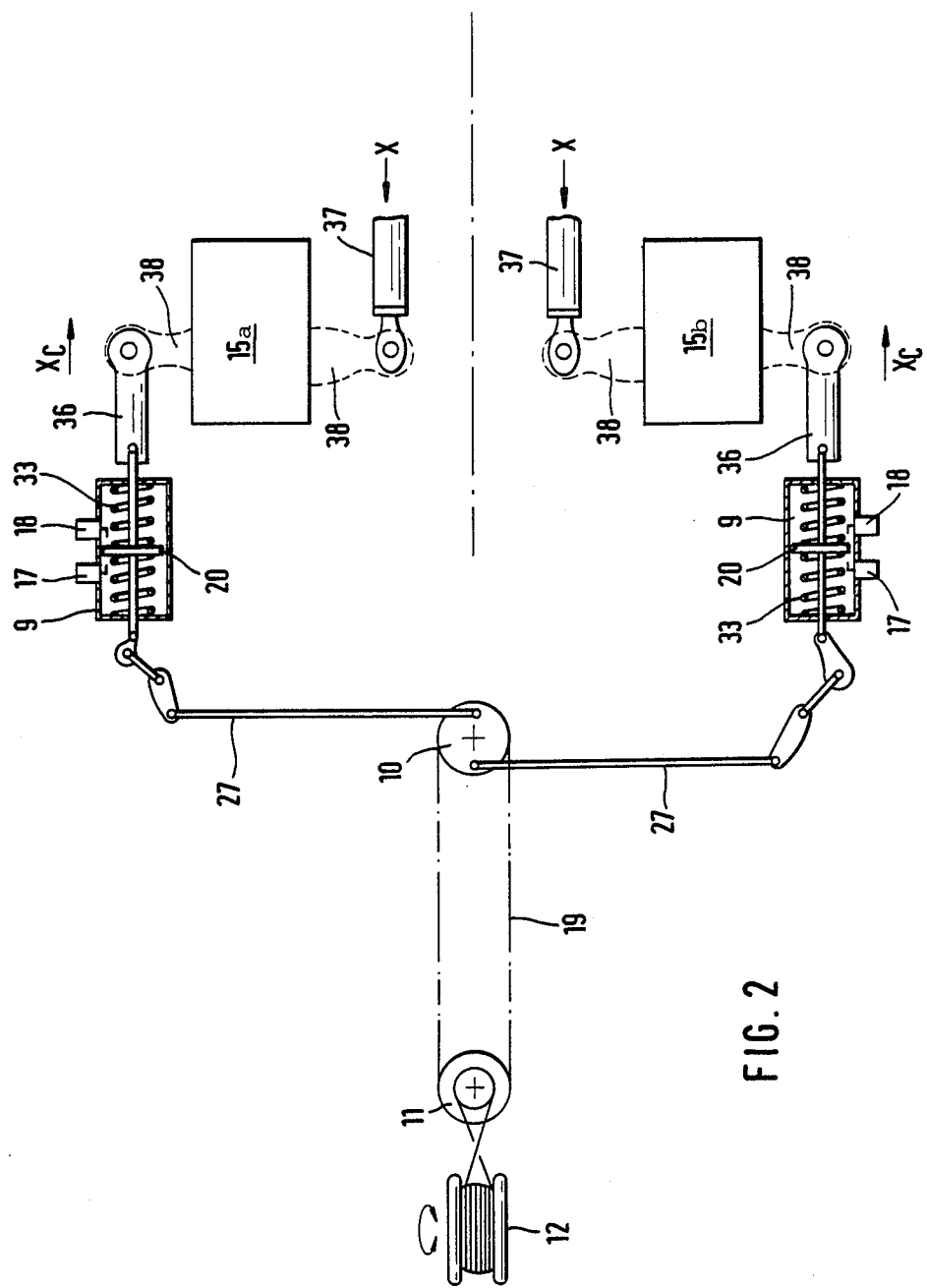
FIG. 2 illustrates in further detail the means for detecting mechanical errors or faults in the mechanically controlled elevator drive system for providing a warning signal to the pilot.

Referring to FIGS. 1 and 2, the transmission of the mechanical control signals from the hand wheel 12 to the mechanically controlled auxiliary hydraulic drive system 8 is accomplished through a cable 19 operatively effective between the hand wheel 12 and a mechanical signal distributor such as a roller 10. A guide roller 11 may be inserted between the hand wheel 12 and the roller 10. The mechanical distributor 10 transmits the mechanical control signals through a signal linkage 27 provided separately for each elevator assembly 5R, 5L, to a switch-off logic unit 32 including a coupling and synchronizing unit 15. These units control the main control valve 16 of each hydro-mechanic auxiliary drive system 8, please see FIG. 3. The switching-off logic units 32 are controlled by the active flight control computers 3 through the switch-off signals 30 and 31 supplied on respective conductors for performing a logic AND-function. If both switch-off signals 30 and 31 are not present, the mechanically operated auxiliary elevator drive 8 is switched-on. However, the presence of any one of the signals 30 or 31 is capable of activating the switch-off logic unit 32 over the valves 28, 29 and a steering pipe 21, whereby the auxiliary hydro-mechanic elevator control or drive system 8 is switched into a bypass state. In that bypass state the mechanical signal connection from the hand wheel 12 to the main control valve 16 is separated by the respective coupling and synchronizing unit 15. In this condition of the auxiliary system, the auxiliary system is without any power application and its hydraulic piston 23 follows the flapping movements of the respective elevator assembly resulting from the operation of one of the primary electrically controlled servo-systems or elevator drives.

If any one of these switch-off signals 30 or 31 is present, the control pressure of the switch-off logic units 32 is maintained at the return flow pressure level and the by-pass valve 16a is in its bypass position. Simultaneously, the couplings 34 at the synchronizing units 15 are open so to speak, at the differential signal linkage 27. In this passivated condition of the mechanically operated auxiliary drive system 8, the elevator assemblies 5R, 5L are driven by the electrically controlled drive or servo-systems 6 and 7 respectively. The mechanical return X of the displaced hydraulic piston 23 over the connecting-rod 37, is taken up or absorbed by the open differential when the hand wheel 12 is either stationary or when it is moved without any valve displacement $X_v$. Incidentally, the displacement of the hand wheel 12 is indicated by $X_c$.

The transition of the auxiliary mechanical drive system 8 from its bypass condition into its active drive condition, will now be described with reference to FIG. 4. In a conventional hydromechanical drive system the pivot or journal point C of the summing lever 42 would be rigidly fixed to a housing. However, according to the invention in the passivated or bypass condition of the system 8 the journal or pivot point C is displaceable since it is released by the springs 40, a fixing element 41 at the summing lever 42 and two centre-piston 39 when control pressure is absent. Only when positive system pressure is present, the respective control pressure fixes the pivot or journal point C according to the invention. In the passive or bypass state the summing lever 42 according to the invention can be tilted about a sliding journal or pivot point. This is possible for any displaced position X of the respective elevator assembly 5R, 5L. Stated differently, the summing lever 42 can slide around its connecting point with the control slide 26 of the main control valve 16 so that the spring centered valve 16 is free of any command signal when control pressure is absent.

In the present disclosure the embodiment is described with reference to a coupling which is operated in response to the control pressure with the effect to open or close a differential sum linkage, whereby the hydromechanic drive system 8 has a fixed housing and a movable piston 23. However, the system also works when the piston is rigidly pivoted to a fixed point and the housing is movable, whereby the same principles apply and the present claims are intended to cover both possibilities.

Figure 4:
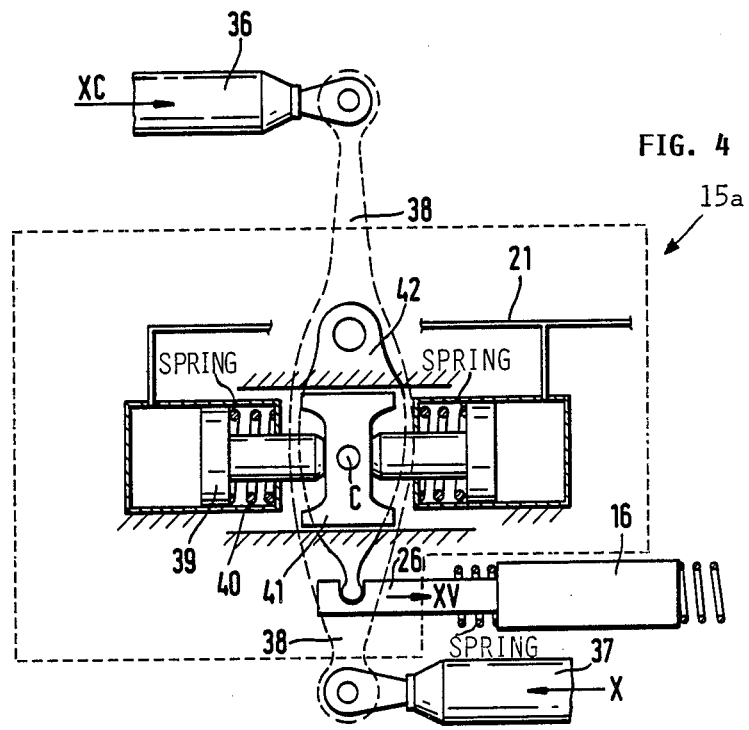
FIG. 4 illustrates the coupling and synchronization unit in its activated position or state.

Referring to FIG. 4, the coupling and synchronizing unit 15a according to the invention will now be described in more detail. The structure and operation of the unit 15b is the same. These units are capable of self-synchronizing relative to the position $X_c$ of the hand wheel 12 and at any position X of the respective elevator assembly. This capability of self-synchronization is also available when switching from the passive state into the active state. When the pivot point C is in the passive state and a positive control signal is applied as an input signal, for the switch-over of the auxiliary system 8 from the passive state into the active state, the pivot point C is shifted relative to the housing if X deviates from $X_c$, whereby a valve displacement $X_v$ is caused. This valve displacement $X_v$ results in a movement of the piston in the cylinders 24 while simultaneously the bypass-valve 16a is switched into its active position. The movement of the piston 24 represents the elevator flap position X and synchronizes that position X with the input signal, or rather with the displacement $X_c$ caused by the input signal, whereby the pivot point C is now in a fixed centered position. Piston movement will stop, if $X=X_c$, and whereby the valve displacement $X_v$ is zero.

According to the invention the following safety devices are provided for monitoring the mechanical signal transmission system against mechanical faults, especially jamming of the mechanical components of the mechanism shown in FIG. 4 including the coupling differential signal link of the hydro-mechanic auxiliary drive system 8.

When a jamming occurs in the mechanical logic circuit of FIG. 4, the auxiliary drive system 8 would not properly function when needed because such jamming would not normally be detected during the normal operation of the electrically controlled drives 6 and 7. In order to prevent such a situation, an elastic spring system, also known as a spring housing 9, is provided between each coupling 27 providing the right and left connection between the pilot operated wheel 12 and the respective coupling and synchronizing unit 15a and 15b connected to the respective flap drive. Each spring housing 9 has a spring element 33 performing the following function. Normally, when the elevator drives are electrically controled, the displacement feedback X of the piston 23 is effective on the open differential and the upper pivots connecting the input lever 38 to the respective push rod 36,is stationary ($X_c=0$). If now a jamming situation is present in one of the two couplings and synchronizing units 16a, 15b, one of the two spring elements 33 will be lengthened due to the mechanical connection of the right-hand mechanical control mechanism with the left-hand mechanical control mechanism through the mechanical signal distributor 10. As shown in FIG. 2, the spring elements 33 are operatively inserted in the respective mechanical elevator linkage 27. The springs 33 of the spring housings 9 take up a centered position when there is no jamming and the elevator control drives 6, 7 are electrically operated. Thus, in the normal operating condition the position sensor 20 inserted in the housing 9 for sensing any off-center position of the respective spring element 33, does not provide a warning signal since everything is normal. The position sensor 20 is located centrally between two sensors 17 and 18 as shown in FIG. 2. When a jamming situation is present, the sensor 20 is respectively displaced out of a centered position, thereby operating one of the position sensors 17 or 18 which in turn provides a warning signal for the pilot.

An additional monitoring of the operability of the mechanically controlled elevator drive system 8 is provided according to the invention in that the "open" differential of the signal transmitting linkage 27 of the hydro-mechanical drive system is capable to absorb or take up the maximally permissible elevator flap deflection X relative to any desired control commands $X_c$ when the electrically controlled drive of the elevator assemblies operates free of faults. Thus, a jamming in the common signal transmitting path is noticed by the pilot by a blocked hand wheel 12 when he tries to test the mechanically operated auxiliary elevator drive system 8 by operating the hand wheel 12 without actually switching on the auxiliary system 8. Such operation of the hand wheel 12 for testing purposes also reveals a jamming in the differential signal transmission linkage 27 because in this instance only the position sensors 17 or 18 of the spring element 33 on the jamming side become effective.

A further feature according to the invention for making sure that the auxiliary drive system 8 functions properly involves the monitoring of the bypass valves 16a for their faultless function. Each valve 16a is equipped with an electrical position sensor 25 which provides a warning signal in the course of an automatic preflight test when the auxiliary system 8 is not in its passive or bypass state. This feature simultaneously tests the correct function of the mechanical switch-off logic units or circuits 32.

During high speed flight it is not permissible that there is a difference between the deflections of the left and right elevator flaps 5R, 5L. Such difference may not even exist when there is a fault in the system. Thus, the invention provides the following precautions for the monitoring of the elevator control operation for avoiding just such a difference in the flap deflections. These precautions are provided in addition to the respective computer monitoring of the elevator operation.

The hydraulic supply systems B and G of the electro-hydraulically operated drive systems 6 and 7 are symmetrically and identically coordinated with the two elevator flaps 5R and 5L in a triplex hydraulic system B, G, and Y, just as the respective active computer symmetrically controls the respective elevator flap 5R, 5L. Thus, a failure of one hydraulic system B or G which is not registered by the active computer 3 or only registered with a delay, leads only to a limited non-symmetry in the deflections of the elevator flaps.

The above described testability of the right-hand and left-hand mechanically operated drive systems to see whether mechanical faults such as jamming or defects in the bypass valve are present, and the testability with regard to faults of the mechanical signal transmitting path from the hand wheel 12 to the mechanically controlled, hydraulically operated auxiliary system 8, make sure that both, the right and left elevator flaps, are synchroneously deflected by the mechanical operation of the auxiliary drive system 8 or that the pilot receives a warning signal when a fault is present. In case such a signal is received, the pilot can, for example, reduce the speed to a nondangerous low speed range in which asymmetric elevator flap deflections due to a one sided fault or defect, are not as dangerous as at very high speeds.

A further feature of the invention is the simple mechanical signal pass between the hand wheel 12 and both elevator flaps 5R, 5L which permits a mechanical control of both. Further, the mechanically controlled auxiliary system 8 produces larger control forces at the elevator flaps 5R, 5L than any single electrically controlled drive system 6 or 7. Additionally, the mechanically controlled auxiliary system 8 is operated by the hydraulic system Y which comprises a ram air turbine. Thus, even if all power plants of the aircraft fail, the hydraulic primary energy for the mechanically controlled auxiliary system 8 is directly available from said turbine.

Another feature of the invention resides in the fact that means or devices can be implemented, that the wheel 12 automatically follows the actual elevator flap deflection through an electromotor 13 during the normal electrically signalled flight control.

Although the invention has been described with reference to specific example embodiments, it will be appreciated, that it is intended to cover all modifications and equivalents within the scope of the appended claims.

What I claim is:

1. An elevator control system especially for an aircraft, comprising right and left elevator assemblies, electrically controlled primary drive means (6, 7) for driving each of said elevator assemblies under normal operating conditions, computer means for controlling said electrically controlled primary drive means (6, 7), mechanically controlled auxiliary drive means (8) for driving each of said elevator assemblies under emergency operating conditions, mechanical control means (12) arranged for actuation by a pilot, mechanical linkage means (27) operatively connected to said mechanical control means and to said auxiliary drive means (8) for enabling a pilot to mechanically control operation of said auxiliary drive means (8), automatically operating logic switch-off means (32) connected to said computer means for normally keeping said auxiliary drive means (8) in an inactive bypass state when said electrically controlled primary drive means are properly operating and for activating said auxiliary drive means in response to a failure of said electrically controlled drive means of both elevator assemblies or in response to a failure of an electrical power supply, switch means (14) including a testing switch (4) operatively arranged for control by a pilot for manually switching off said electrically controlled drive means while substantially simultaneously activating said auxiliary drive means (8), said mechanical linkage means comprising mechanical signal distributing means and cable means connecting said mechanical control means (12) to said mechanical signal distributing means for simultaneously distributing pilot initiated mechanical control signals to a left branch and to a right branch of said mechanical linkage means, said mechanical linkage means further comprising spring means arranged in each of said left and right branches, and coupling and synchronizing units (15) connected to said left and right branches through said spring means for transmitting said pilot initiated control signals to said auxiliary drive means (8), electric drive means (13) arranged for normally transmitting a deflection of said elevator assemblies to said mechanical control means when said elevator assemblies are driven by said electrically controlled primary drive means, and ram air turbine means for producing hydraulic pressure for said auxiliary drive means (8) when all engines fail.

2. The system of claim 1, wherein said testing switch (4) and said switch means (14) are normally closed switches which are opened by a pilot when an emergency occurs or when the auxiliary drive means (8) are to be tested.

3. The system of claim 2, wherein said switch means comprise control lines for deactivating said electrically controlled primary drive means and for activating said auxiliary drive means (8), said switch means being selectively operable for interrupting individual control lines or all control lines.

4. The system of claim 1, wherein said auxiliary drive means (8) comprise piston cylinder means (23, 24) for operating each respective elevator assembly (5R, 5L), said automatically operating logic switch-off means (32) comprising input control valves (28, 29) receiving logic input signal conditions, differential means (34, 35) responsive to said input control valves, main control valve means (16) and bypass valve means (16a) arranged for cooperation with said input control valves and with said differential means (34, 39) so that a mechanical feedback (X) from said piston cylinder means (23, 24) to said differential means (34, 39) is absorbed when said differential means are "open" and when said mechanical control means (12) are stationary or being operated without causing a displacement ($X_v$) of said main control valve means (16), whereby said by-pass valve means (16a) is held in a bypass position.

5. The system of claim 1, wherein said coupling and synchronizing units (15) comprise a summing lever (42) having a normally floating pivot or journal axis (C) when said auxiliary drive means (8) is in its inactive bypass state, and means for fixing the position of said pivot or journal axis (C) in response to a control pressure in said auxiliary drive means (8) corresponding to normal hydraulic pressure.

6. The system of claim 5, further comprising spring means (40) operatively arranged for releasing said summing lever (42) when said control pressure is absent.

7. The system of claim 4, wherein said piston cylinder means (23, 24) have a fixed position cylinder (24) and a movable piston with a piston rod connected to said automatically operating logic switch-off means (32), or a moving cylinder (24) with fixed structural attached piston.

8. The system of claim 4, wherein said automatically operating logic switch-off means (32) automatically synchronize mechanical control signals representing a movement ($X_c$) of said mechanical control means (12), with an elevator assembly deflection (X) during a switch-over of said auxiliary drive means (8) from its inactive bypassed state to its active state.

9. The system of claim 1, wherein said auxiliary drive means (8) produce larger control drive forces for the respective elevator assembly than any one of said electrically controlled primary drive means (6 or 7).

10. The system of claim 1, further comprising position sensor means (17, 18) operatively interposed in said mechanical linkage means (27) for sensing mechanical faults in the auxiliary drive system and in said mechanical linkage means and for providing a warning signal when a mechanical fault is detected.

11. The system of claim 10, wherein said position sensor means comprise a spring box (9) for sensing said mechanical faults.

12. The system of claim 4, further comprising a position sensor member (25) for monitoring said bypass valve means (16a), said bypass valve means (16a) being hydraulically connected to said coupling and synchronizing units (15, FIGS. 3 and 4), said position sensor member (25) for automatically and electrically providing test information indicating the inactive bypass state of said auxiliary drive means as caused by said logic switch-off means (32) activated by signals on lines (30, 31).

13. The system of claim 1, further comprising pressure relief valve means operatively connected to said electrically controlled primary drive means (6, 7) to assure that said auxiliary drive means (8) are effectively operable even if said primary drive means are blocked.

14. The system of claim 1, wherein said mechanical control means comprise a pitch control wheel (12).

* * * * *